(12) United States Patent
Jeong

(10) Patent No.: US 7,331,558 B2
(45) Date of Patent: Feb. 19, 2008

(54) LONG SLIDE TYPE RAIL SYSTEM FOR DETACHABLE VEHICLE SEAT

(75) Inventor: Chan Ho Jeong, Seoul (KR)

(73) Assignee: Kia Motors Corporation, Seoul (KR)

( * ) Notice: Subject to any disclaimer, the term of this patent is extended or adjusted under 35 U.S.C. 154(b) by 399 days.

(21) Appl. No.: 11/024,861

(22) Filed: Dec. 28, 2004

(65) Prior Publication Data

US 2005/0247846 A1 Nov. 10, 2005

(30) Foreign Application Priority Data

May 7, 2004 (KR) ...................... 10-2004-0032058

(51) Int. Cl.
*F16M 13/00* (2006.01)
(52) U.S. Cl. ...................... 248/429; 248/430; 248/419; 297/344.1; 296/65.13
(58) Field of Classification Search ................ 248/429, 248/430, 432, 419; 297/344.1; 296/65.13, 296/65.14, 65.15
See application file for complete search history.

(56) References Cited

U.S. PATENT DOCUMENTS

| | | | |
|---|---|---|---|
| 3,899,151 A * | 8/1975 | Kobrehel ................... 248/429 |
| 4,881,774 A * | 11/1989 | Bradley et al. ............. 297/341 |
| 5,498,051 A * | 3/1996 | Sponsler et al. .......... 296/65.03 |
| 5,743,596 A * | 4/1998 | Chabanne ................ 297/463.1 |
| 5,785,292 A * | 7/1998 | Muraishi et al. ............ 248/429 |
| 5,961,088 A * | 10/1999 | Chabanne et al. .......... 248/429 |
| 6,059,345 A * | 5/2000 | Yokota ..................... 296/65.14 |
| 6,155,626 A * | 12/2000 | Chabanne et al. ....... 296/65.03 |
| 6,375,246 B1 * | 4/2002 | Nicola et al. ............ 296/65.03 |
| 6,523,899 B1 * | 2/2003 | Tame ........................ 297/331 |
| 7,152,925 B2 * | 12/2006 | Hur et al. .............. 297/378.13 |
| 2006/0012231 A1 * | 1/2006 | Hur et al. ................... 297/336 |

* cited by examiner

*Primary Examiner*—Kimberly Wood
(74) *Attorney, Agent, or Firm*—Morgan Lewis & Bockius LLP

(57) ABSTRACT

Disclosed herein is a slider rail for adjusting a longitudinal position of a detachable vehicle seat. The slide rail includes right and left fixed rails capable of being mounted on a vehicle body floor panel in a longitudinal direction and in parallel to each other, and a moving rail installed inside the fixed rails and capable of adjusting the position thereof along the length of the fixed rail. The moving rail includes a plurality of strikers to which a locking device at the lower side of the seat is to be locked and a moving means for being moved inside the fixed rail. The rail comprises a locking assembly for selectively carrying out a locking or a locking-release between the fixed rails and the moving rail, and a locking-release operating means for operating the locking assembly so as to release a locking between the two rails.

6 Claims, 11 Drawing Sheets

LONG SLIDE TYPE RAIL SYSTEM FOR DETACHABLE VEHICLE SEAT

CROSS REFERENCE TO RELATED APPLICATION

This application is based on, and claims priority to, Korean Patent Application No. 2004-0032058, filed on May 7, 2004, the disclosure of which is hereby incorporated by reference.

BACKGROUND OF THE INVENTION

1. Field of the Invention

The present invention relates the vehicle seats. More specifically, the present invention relates to a slider rail that allows for the detaching and longitudinal positioning of a vehicle seat.

2. Background of the Related Art

As lifestyles improve and formerly complex objects are simplified, multi-purpose products having various functions have been introduced to market. This is due to man's natural desire for a more convenient and simple life by avoiding unnecessary work and financial loss. For example, a multi-purpose vehicle is utilized in a business capacity for transporting luggage on business trips, and in a personal capacity for transporting goods on family road trips. Most of these multi-purpose vehicles are passenger cars that also have commercial functions.

Different from common passenger cars, these multi-purpose vehicles are designed so that their inner space can be changed for various purposes when required. For example, in multi-purpose vehicles, the rear seats (such as the second or third row of seats) can be detached, thereby enabling an easy switch of roles between a cargo space and a passenger seat. This detachable seat can be easily separated from the vehicle body floor panel when a large cargo area is required and expansion of the inner space of the vehicle is required. A locking device is installed below the seat for fixing the seat to or releasing the seat from the floor. This detachable seat must be constructed so that a user can easily detach or mount it, but more importantly to ensure the user's safety.

Additionally, to further increase efficient use of the a multi-purpose vehicle's inner space, it is desirable that the position of the seat and its mounting state be adjusted flexibly and variously, as compared to a common passenger car. For example, the conventional position adjustment of passenger seats has been related to a user's comfort, depending on his or her physical body condition. However, recent multi-purpose vehicles require, for more efficient use of the space thereof, detachability of the seat, double-folding of the seat, and increased sliding length of the seat.

The conventional slider rail, however, does not provide adequate sliding length. Particularly, in the case of a detachable seat, locking the seat to a striker fixed to the vehicle body is required, and therefore there is a structural limitation in lengthening the sliding length. For conventional passenger seats, if a longer fixed rail is fixed to the vehicle body floor panel, the position-adjustable length can be increased. In case of a conventional detachable seat, however, the fixed rail must to be affixed to a stationary locking device. Consequently, a limitation exists in increasing the position-adjustable length.

Furthermore, conventionally, the slider rail is installed inside the seat so that the weight of the whole seat is inevitably increased, and thus a user must handle the heavy seat when mounting or detaching it, thereby leading to inconvenience in the mounting and detaching work.

SUMMARY OF THE INVENTION

Therefore, it is an object of the present invention to provide a slider rail for adjusting a longitudinal position of a detachable vehicle seat. The present invention provides a slider rail for adjusting the longitudinal position of a detachable vehicle seat. The slider rail includes right and left fixed rails capable of being mounted on a vehicle body floor panel in a longitudinal direction and in parallel to each other, the rails being relatively long; a moving rail installed inside each fixed rail, wherein each moving rail's position is adjustable along the length of its fixed rail, each moving rail including a plurality of strikers to which a locking device at the lower side of the seat can be locked and a moving means for being moved back and forth inside the fixed rail; a locking assembly for selectively carrying out a locking or a locking-release between the fixed rail and the moving rail; and a locking-release operating means for operating the locking assembly so as to release a locking between the two rails.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 8c is an enlarged side view of the rear locking mechanism in the locking device of FIG. 8a;

DETAILED DESCRIPTION OF THE PREFERRED EMBODIMENT

Figure 1:
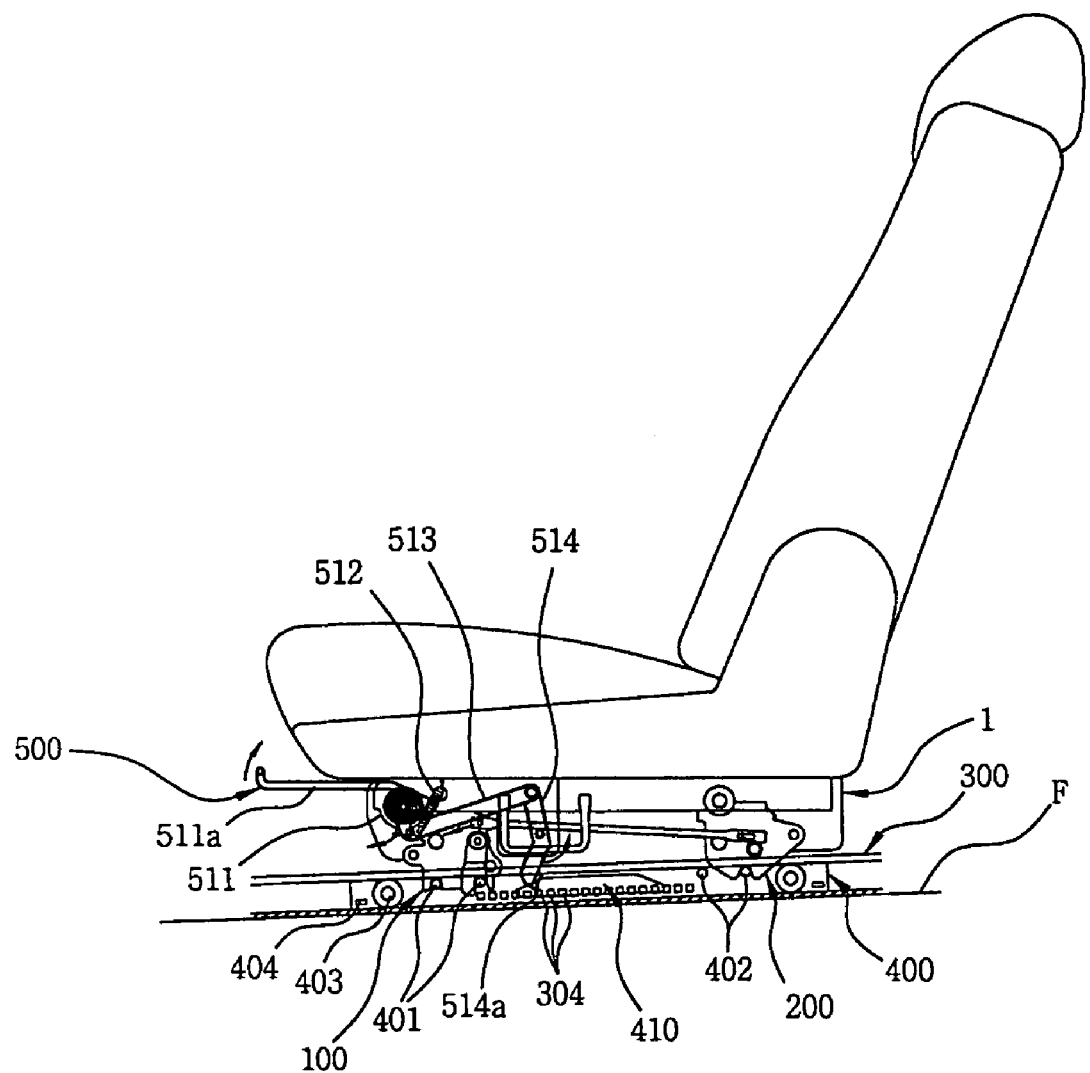
FIG. 1 is a side view of a vehicle seat with a long slider-type rail system according to one embodiment of the invention.
Figure 2:
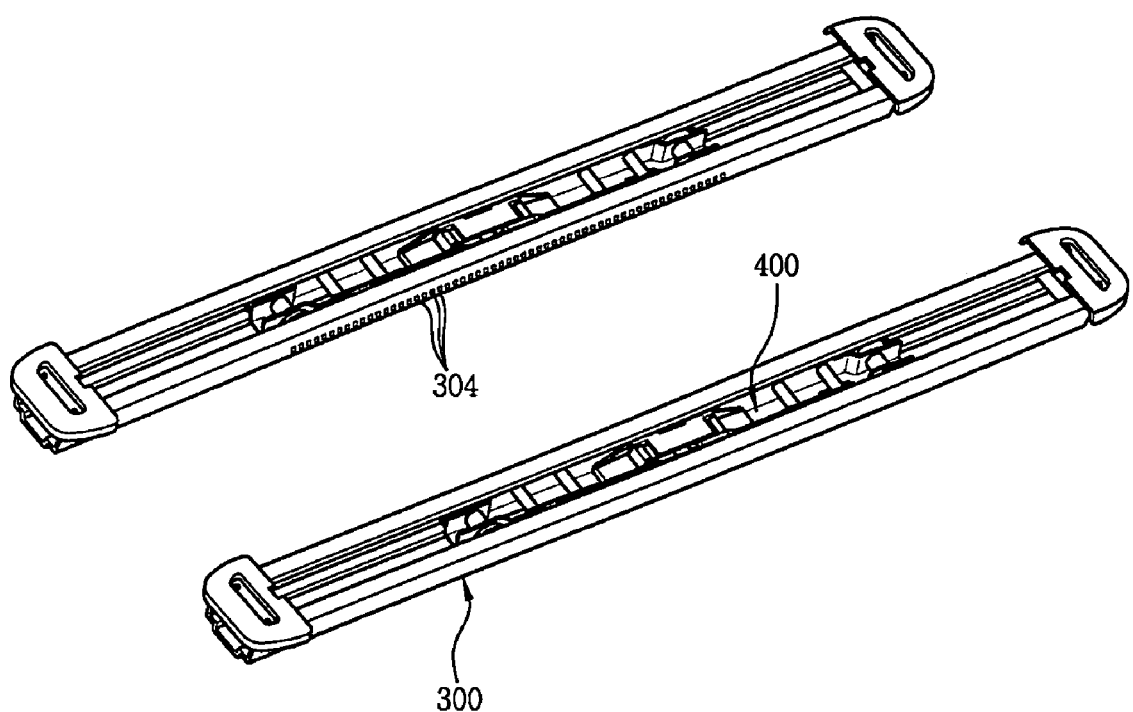
FIG. 2 is a perspective view of a long slider-type rail system according to one embodiment of the invention.
Figure 3:
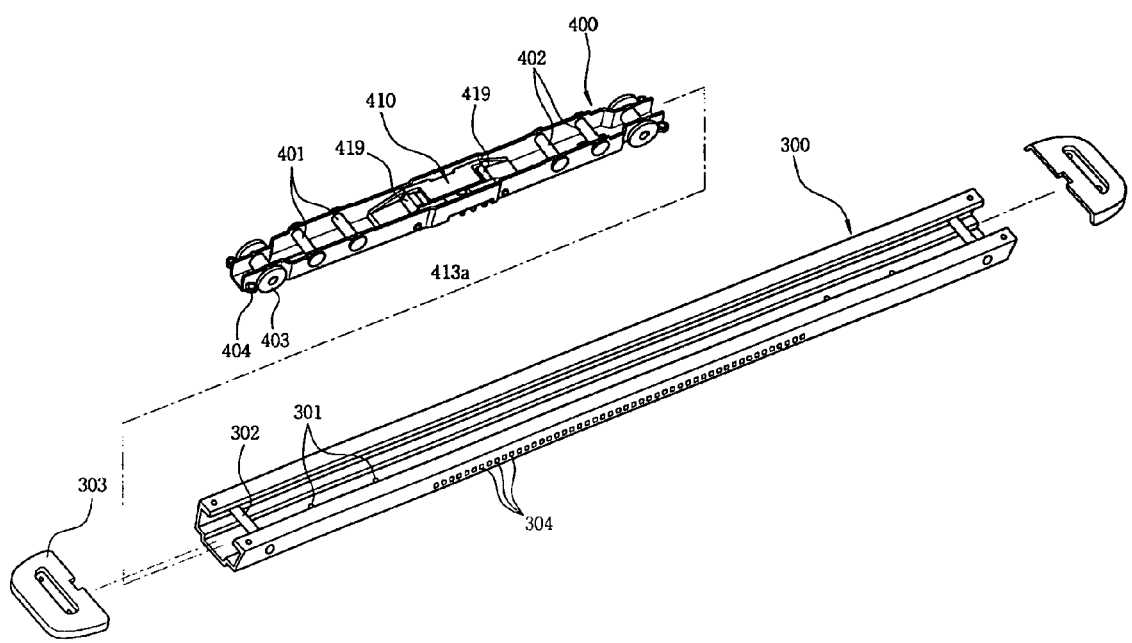
FIG. 3 is a perspective view of a long slider-type rail system of the invention where a moving rail and a fixed rail are disassembled.

Reference will now be made in detail to an embodiment of the present invention with reference to the attached drawings. FIG. 1 is a side view of a vehicle seat to which a long slider-type rail system according to the invention is applied. FIG. 2 is a perspective view of a long slider-type rail system according to one embodiment of the invention. FIG. 3 is a perspective view of the long slider-type rail system of the invention where a moving rail and a fixed rail are disassembled. Referring now to FIG. 1, a long slider-type rail for a detachable seat according to the invention is structured such that it can be mounted on the vehicle body floor panel F and a striker can be moved back and forth. This is different from conventional detachable seats, which have the rails mounted inside the seats. A left rail and a right rail are disposed and mounted in a longitudinal direction on the vehicle body floor panel F, and locks and holds a detachable seat. As can be seen in FIG. 2, each rail includes a fixed rail 300 and a moving rail 400.

Referring now to FIG. 3, the fixed rail 300 is mounted on the vehicle body floor panel F longitudinally in such a fashion that the bottom face of the fixed rail 300 is fixed to the vehicle body floor panel F by a plurality of bolts 301. The fixed rail 300 is provided with a stopper member 302 installed at both front and rear ends thereof so that the stopper member 302 prevents the moving rail 400 from escaping from the fixed rail 300 when the locking state between the moving rail and the fixed rail is released. A stopper cover 303 is fixedly installed above the stopper member 302 of the fixed rail 300.

The fixed rail 300 is longer relative to the moving rail 400, which is structured to be able to move longitudinally inside the fixed rail 400. In other words, the moving rail 400 is configured such that it can slide forwards and backwards inside the fixed rail 300. In addition, each fixed rail 300 is provided with a plurality of locking holes 304 formed at regular intervals along the length of one sidewall thereof. The locking holes 304 serve to lock a lock plate (413 in FIG. 5) of a locking assembly, which will be described further in reference to FIG. 5. The moving rail 400 is structured such that it is installed inside the fixed rail 300 and can be moved along the length thereof. The detachable seat is locked and held on the moving rail 400. The moving rail 400 is configured such that it can fix its longitudinal position.

FIG. 1 shows front and rear end locking mechanisms 100 and 200 of a locking device 1 that are locked with the moving rail 400, which can be moved together with the seat. The longitudinal position of the seat is adjusted by the longitudinal movement of the moving rail 400. With its position adjusted, when the moving rail is locked with the fixed rail fixed on the vehicle body, the position of the seat is fixed. The moving rail 400 is provided with a plurality of strikers 401, 402, to which the locking device 1 is locked, and a moving means for moving forwards and backwards inside the fixed rail 300. A locking means is installed to selectively perform locking or locking-release between the fixed rail 300 and the moving rail 400.

Figure 4:
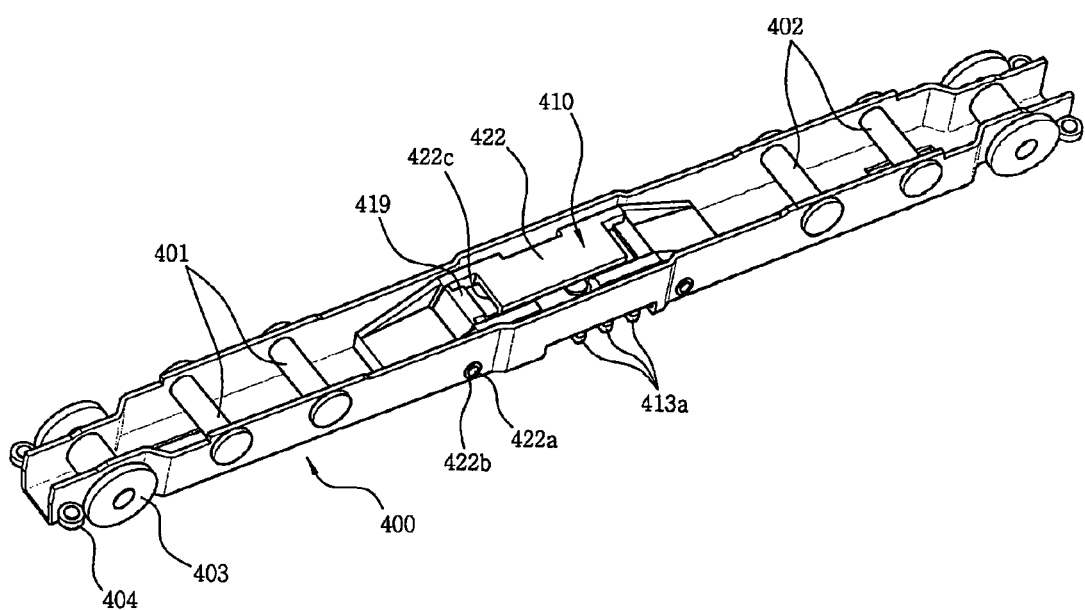
FIG. 4 is a perspective view of the moving rail.

FIG. 4 is a perspective view of the moving rail according to the invention. As a means for moving forwards and backward inside the fixed rail 300, main rollers 403 are mounted at both sides of the front and rear portion of the moving rail. The main rollers 403 move along the bottom surface of the fixed rail 300. At both sides of the front and rear end portions of the moving rail are mounted auxiliary rollers 404, which moves along the inner side of both sidewalls of the fixed rail 300. The auxiliary rollers 404 facilitate a smooth movement of the moving rail 400 inside the fixed rail 300. That is, the auxiliary rollers 404 prevent both lateral faces of the moving rail 400 from directly contacting the inner surface of the sidewall of the fixed rail 300, thereby providing the smooth movement of the moving rail 400.

In addition, as a means for selectively performing a locking and locking-release between the fixed rail 300 and the moving rail 400, a locking assembly 410 is mounted in the middle of the length of the moving rail 400. The locking assembly 410 has a lock plate 413, which is selectively locked with or released from the locking hole 302 of the fixed rail 300 by the operation of an operating lever 419. The locking assembly 410 is further provided with two front strikers 401 and two rear strikers 402, transversely disposed respectively forwards and rearwards of the assembly 410. The rear striker 402 is symmetrically disposed about the locking assembly 410 at the center thereof. The space between the two front strikers 402 is the same as that between the two rear strikers 402.

The construction of the locking assembly will be hereafter explained in greater detail. The locking assembly 410 serves to selectively carry out a locking and a locking-release between the fixed rail 300 and the moving rail 400. A detachable seat is locked and held to the moving rail 400 by a locking device 1 provided at the lower end portion of the seat. Additionally, the locking assembly 410 is structured such that it maintains the locking state between two rails 300 and 400 when any external operation is not performed, and it releases the locking state between the two rails when an external operation is carried out by operating a locking-release operation means 500, which will be hereinafter described.

Figure 5:
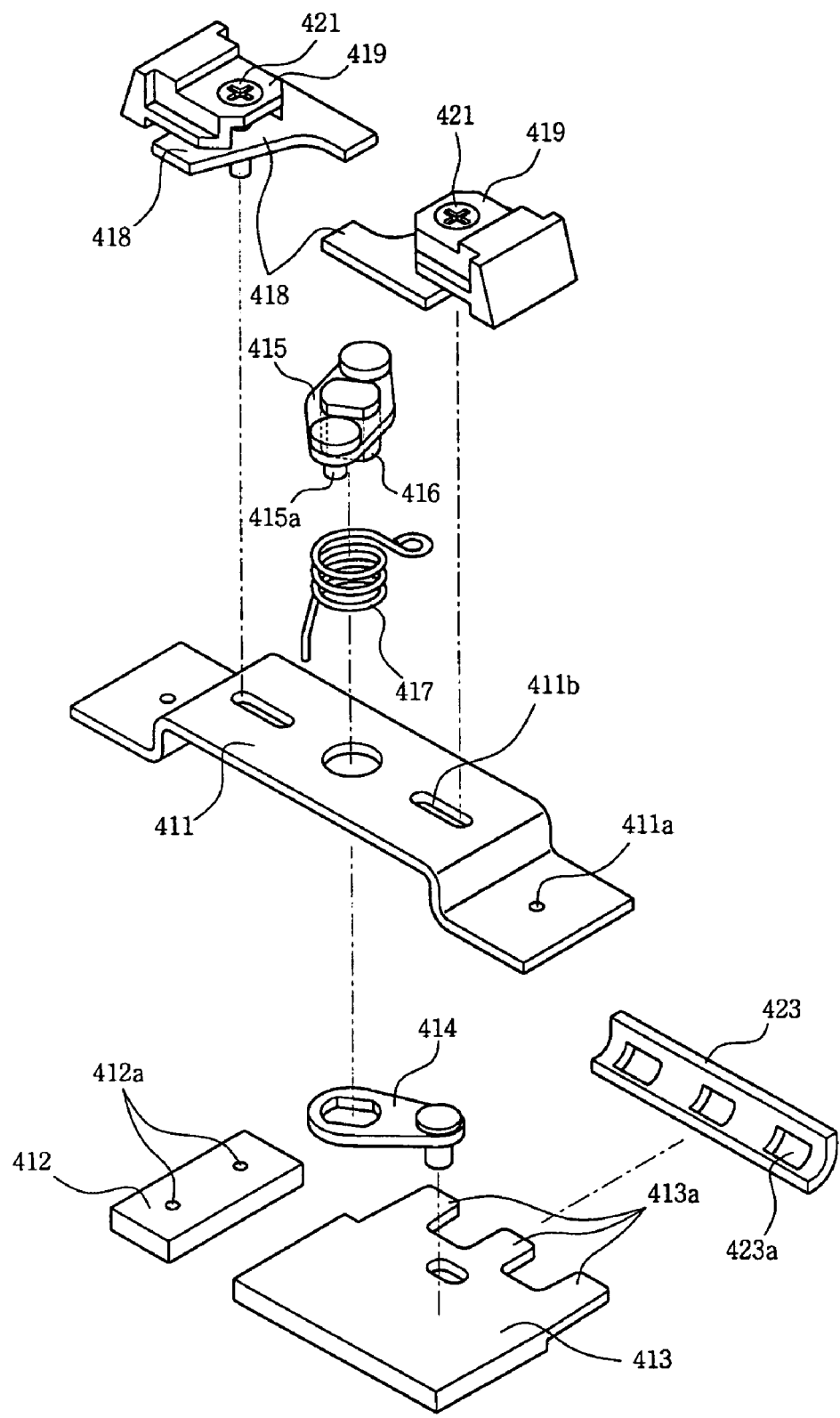
FIG. 5 is an exploded view of a locking assembly according to the invention where a cover is omitted.
Figure 6:
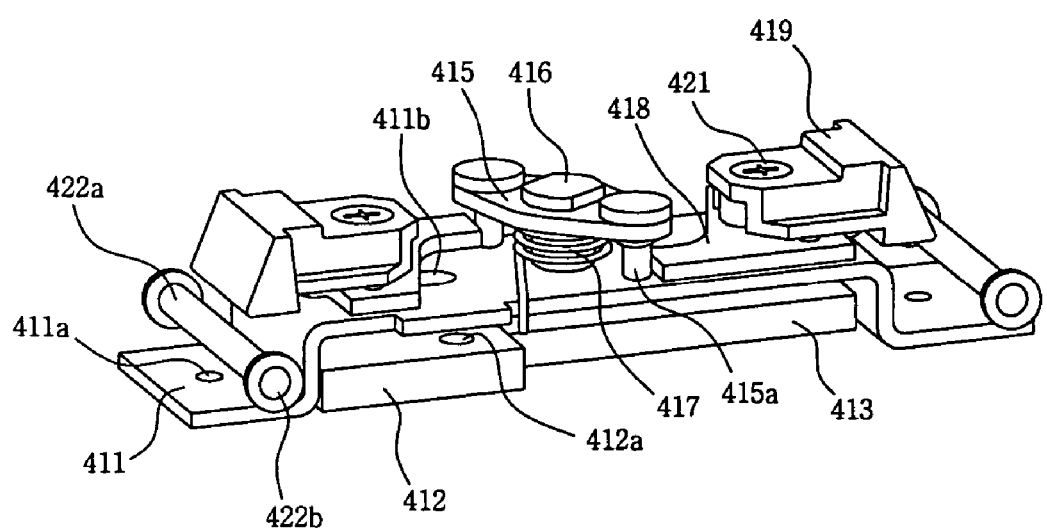
FIG. 6 is a perspective view of the locking assembly without the cover.
Figure 7A:
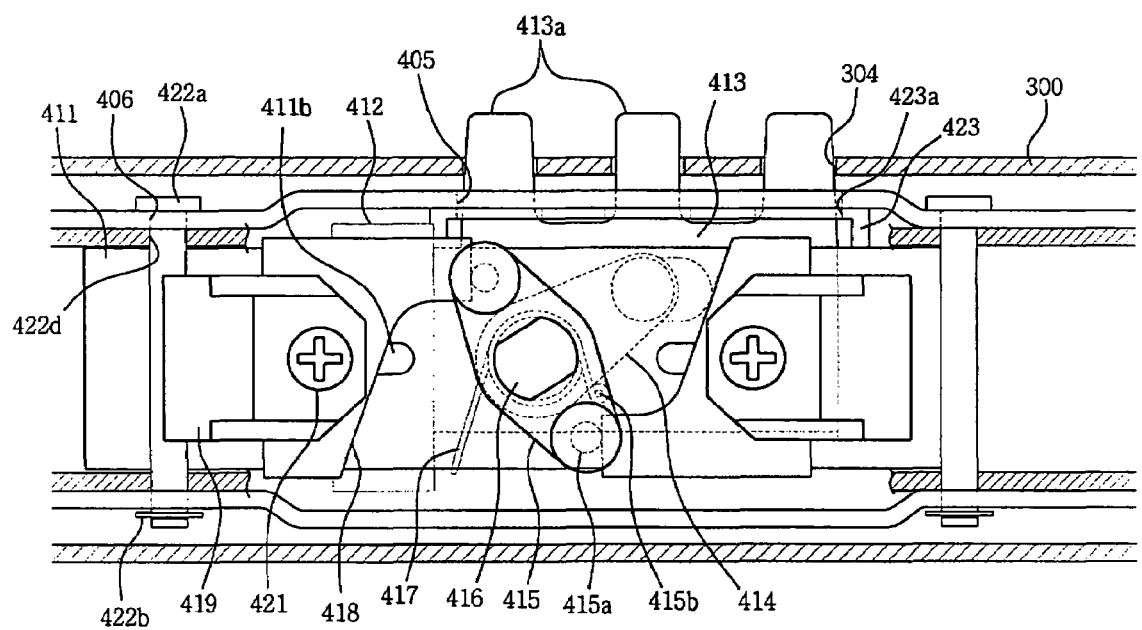
FIGS. 7a and 7b are top plan views showing respectively a locking state and locking-release state of the locking assembly.
Figure 7B:
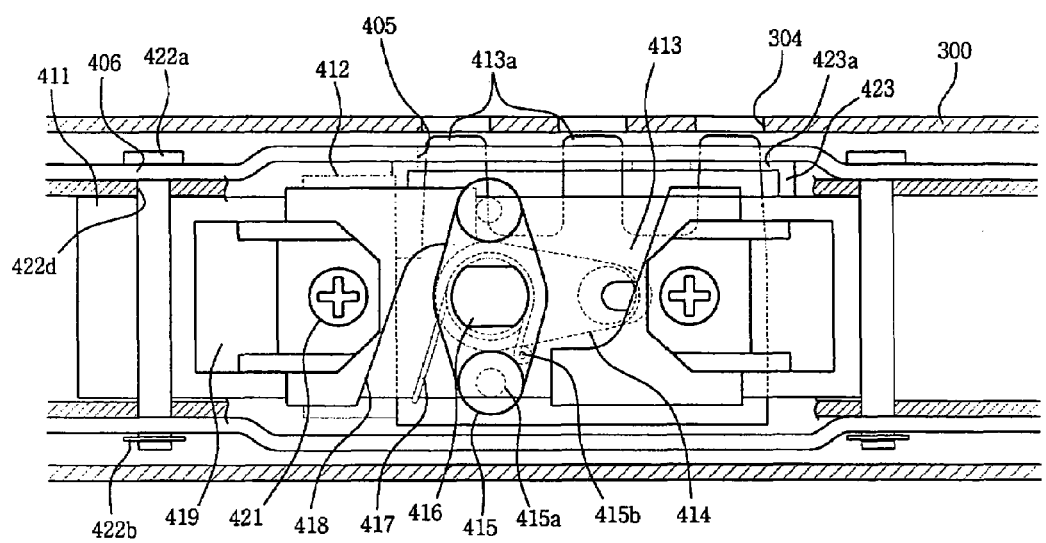

FIG. 5 is an exploded view of the locking assembly where a cover is omitted, and FIG. 6 is a perspective view of the locking assembly inside the cover when it is assembled. FIGS. 7a and 7b show respectively a locking state and locking-release state of the locking assembly, and are top plan views illustrating respectively a locking state and locking-release state of the locking assembly, where the internal construction of the assembly is shown without its cover in order to clearly explaining the operating state thereof, similar to FIGS. 5 and 6. In FIGS. 7a and 7b, reference numerals 422a and 422b denote respectively a stud and a fixing ring for fixing the cover (not shown, denoted by reference numeral 422 in FIG. 4) to the moving rail 400.

A base bracket 411 is mounted on the mounting portion of the locking assembly 410 (on the bottom surface of the central portion of the moving rail 400). The base bracket 411 is formed of a '⌐'-shaped structure to thereby provide a space between the bottom surface of the moving rail 400 and the bracket 411. The base bracket 411 is fixed to the bottom surface of the moving rail 400 by fastening a bolt (not shown) through a connection hole 411a, which is provided at both end portions thereof. The base bracket 411 is provided with a guide slot 411b for guiding a push plate 418 in a forward and backward direction, which will be hereinafter described. The guide slot 411b is formed at the front and rear portions of the top surface of the base bracket 411, respectively (in the left and right portion in the figure).

A base block 412 is provided at one side of the space between the center portion of the base bracket 411 and the bottom surface of the moving rail 400. The base block 412 is fixedly connected to the bottom surface of the moving rail 400 by a bolt (not shown) through a connection hole 412a. In the remaining space thereof is housed a lock plate 413, which is to be locked to a locking hole 304 of the fixed rail 300. The lock plate 413 is provided with a plurality of teeth 413a formed at one side thereof at regular intervals, which is to be locked into the locking hole 304 of the fixed rail 300. That is, the tooth 413a is configured such that it can be locked into and released from the locking hole 303 of the fixed rail 300 through a side hole 405, which is formed in the sidewall of the moving rail 400. When the tooth 413a of the lock plate 413 is inserted into the locking hole 303 of the outside fixed rail 300, a locking is achieved between the fixed rail 300 and the moving rail 400. When the tooth 413a of the lock plate 413 is pulled out from the locking hole 303 of the fixed rail 300, the locking state between the two rails 300 and 400 is released from each other.

When the locking-release operation of the locking assembly 410 is being performed, the lock plate 413 is drawn inwardly of the moving rail 400 by the rotating force of a linkage member 414, in such a fashion that the tooth 413a of the lock plate is pulled out from the locking hole 304 of the fixed rail 300. The rotating force of the linkage member 414 will be explained hereinafter.

A guide member 423 is installed in the inner side of the side hole 404 of the moving rail 400. The guide member 423 is provided with a plurality of holes 422a, through which each tooth 413a of the lock plate passes. Each hole 423a of the guide member 423 is structured so as to guide the tooth 413a of the lock plate when in the lateral movement of the lock plate 413.

The linkage member 414 is placed above the lock plate 413. One end of the linkage member 414 is hinged to the lock plate 413, and the other end thereof is integrally connected and fixed to the lower end portion of the rotating axle 416 of a central lever 415. Therefore, the linkage member 414 is rotated by the rotation of the central lever 415 such that the lock plate 413 is drawn inwards of the moving rail 400 or pushed outwards of the moving rail 400.

The central lever 415 is integrally mounted and fixed on the upper end portion of the rotating axle 416, which passes vertically through the base bracket 411. The central lever 415 is configured in such a fashion as to be rotated by an operating pin 415a, which is pushed by a pushing plate 418 above the base bracket 411. The central lever 415 is symmetrical left-and-right about its central portion, which is inserted into and fixed to the upper end portion of the rotating axle 416. As shown in FIG. 7a, the central lever 415 is inclined such that both end portions thereof is oriented towards two pushing plates 418, which is placed at both front and rear sides (right and left sides in the drawing). That is, it is disposed approximately in a diagonal direction relative to the base bracket 411.

Furthermore, the central lever 415 is provided with an operating pin 415a installed in both end portions thereof and projected downwardly therefrom. The operating pin 415a is pushed by the leading end portion of one side pushing plate 418 upon the locking-release operation. When the pushing plate 418 pushes the operating pin 415a, the central lever 415 is rotated and then the linkage member 414 below the base bracket 411 is rotated, such that the lock plate 413 is drawn inwards of the moving rail 400.

A return spring 417 is installed in the rotating axle 416 of the central lever 415 in order to provide a resilient restoring force between the base bracket 411 and the central lever 415. The central lever 415 is resiliently rotated by the return spring 417. The upper end of the return spring 417 is fixed to the base bracket 411, and the opposite lower end thereof is fixed to a fixing projection 415b, which is installed in and projected from the bottom surface of the central lever 415. The return spring 417 exerts its spring force in order for the central lever 415 to be rotated counterclockwise in the figure. When the central lever 415 overcomes the spring force of the return spring 417 and thus rotates clockwise in the figure, the lock plate 413 is drawn inwards of the moving rail 400 by the rotating axle 416 thereof and the linkage member 414 below the base bracket, thereby releasing the locking with the fixed rail 300. When the central lever 415 is rotated counterclockwise by the resilient restoring force of the return spring 417, the lock plate 413 is pushed outwards of the moving rail 400 by the rotating axle 416 and the linkage member 414, thereby performing a locking with the fixed rail 300. When the locking assembly 410 is not operated by an external force, it remains in a locked state since the spring force of the return spring 417 is biased counterclockwise with reference to the central lever 415.

The pushing plate 418 is integrally coupled to the upper operating lever 419 such that it can slide on the top surface of the base bracket 411 along the guide slot 411b. The push plate 418 is constructed such that it moves towards the central lever 415 together and its leading end portion pushes the operating pin 415a at one side of the central lever 415, when the operating lever 419 is pressed. The operating lever 419 is fastened atop the pushing plate 418 by means of a bolt 421 so that it can move forwards and backwards integrally along the pushing plate 418. The operating lever 419 is configured such that it moves towards the central lever 415 when the pressing end 514a of the locking-release operating means 500 is pushed inwardly of the cover 422 from the outside thereof.

The bolt 421, which passes vertically through the operating lever 419 and the pushing plate 418, is guided with its lower end portion inserted into the guide slot 411b when it moves forwards and backwards. Accordingly, the operating lever 419 and the pushing plate 418 are guided along the guide slot 411b.

In addition, the operating lever 419 and the pushing plate 418 are symmetrically disposed about the rotating axle 416 of the central lever 415, i.e., each one at the front and rear side (at the right and left side in the figure). They are configured such that any one of the front and rear operating levers 419 can be pressed to thereby rotate the central lever 415 in the same direction. The pressing end 514a of the locking-release operating means 500 is constructed such that the left operating lever 419 is pushed at its left end portion and the right operating lever is pushed at its right end portion. When both of the two operating lever 419 remain unpressed, the operating pin 415a of the central lever 415 remains in contact with the leading end of the pushing plate 418 by the spring force of the return spring 417.

On the other hand, the above-described elements are placed inside the cover 422, which is fixed to the moving rail 400. The cover 422 is fixed and held in place by means of a front and rear studs 422a, which passes transversely through the cover 422 and the moving rail 400. That is, in order for the cover 422 to cover all the elements inside the moving rail 400, each stud 422a is inserted transversely into the connection holes 406 and 422d of the both sidewalls of the moving rail 400 and of the both sidewalls of the cover 422 and protruded into the opposite sides. The stud 422a is fixed in place by inserting a fixing ring 422b into the end portion thereof protruded into the opposite side. The cover 422 is provided with an opening 422c formed in the front and rear portion of the top portion thereof. Part of the front and rear operating levers 410 is exposed outside the cover 422. Also, both lateral edges of the pushing plate 418 is latched at the inner step of the opening 422c of the cover 422, so that the operating lever 419 is kept from escaping outside the cover 422.

The long slider-type rail also includes a locking-release operating means 500, which is operated so as to release the locking between the two rails 300 and 400. The locking-release operating means will be hereafter described, in conjunction with FIG. 1. The locking-release operating means 500 is operated by a user in such a way that the operating lever 419 of the locking assembly 410, which is installed in the moving rail 400, is pressed inwards of the cover 422 in order to release the locked state of the locking assembly 410. The locking-release operating means 500 is installed in the locking device 1 disposed at the lower end portion of a seat, i.e., in the front portion of the seat where the front locking mechanism 100 of the locking device 1 is installed. More specifically, it is installed in the front portion of the leg frame 10. The long slider-type rail is installed on the vehicle body floor panel below the seat in a symmetrical fashion, having the same right and left constructions. Also, the locking-release operating means 500 is installed in the left and right leg frame 10 in a right-and-left symmetrical fashion, having the same structures.

The operating lever 511 is provided such that it can be resiliently rotated inside the leg frame 10. Linkage mechanisms 513 and 514 are provided such that it can be synchronized with the rotating operation of the operating lever 511 to press the operating lever 419 of the locking assembly 410 towards the inside of the cover 422. The operating lever 419 is provided with an elongated handle 511a formed forwards of the rotating center established inside the leg frame 10. The operating lever 419 includes a linkage mechanism installed in the opposite side of the handle 511a.

The handle 511a is installed in such a fashion that part of the front end thereof is protruded from the upper side of the seat. The handle 511a has generally a [-shaped structure such that each end portion thereof is connected with each of the right and left operating levers 511, thereby operating simultaneously the locking assemblies 410 of the two moving rails 400 disposed respectively at the left and right sides of the seat.

The operating lever 511 is disposed at the opposite side of the handle 511a and structured such that it can be resiliently rotated by the return spring 512, which is installed in the leg frame 10. The return spring 512 serves to draw one side of the operating lever so as to rotate the operating lever 511 counterclockwise in the figure.

The linkage mechanism is composed of a first linkage rod 513 with one end thereof connected to the end portion of the operating lever 511 at the opposite side of the handle 511a, and a second line 514 with one end thereof connected to the other end of the first linkage rod 513. The other end of the second linkage rod 514 constitutes the pressing end 514a, which is to press the operating lever 511. The second linkage rod 514 is rotatably installed inside the leg frame 10. When the operating lever rotates, the first linkage rod 513 moves forwards and backwards to draw or push the second line 514 to thereby rotate it.

In order to move forwards and backwards the seat with its position fixed, first, the locked state of the locking assembly 410 must be released. To this end, when the user draws upwardly the handle 511a of the operating lever placed at the front side of the seat, the operating lever 511 overcomes the spring force of the return spring 512 to rotate clockwise in the figure about the rotating center, and consequently the first linkage rod 513 is drawn forwards of the seat to thereby rotate the second linkage rod 514 counterclockwise in the figure. Accordingly, the pressing end 514a at the lower end of the second linkage rod 514 pushes the operating lever 419 towards the rear side of the seat (towards the inside of the cover) (refer to FIG. 1). In this way, when the operating lever 419 is pressed by the operation of the locking-release operating means 500, the locked state of the locking assembly 410 between the fixed rail 300 and the moving rail 400 is released. The handle 511a is connected to both of the right and left operating levers 511, which are to be pressed simultaneously. Accordingly, the locking assembly 410 of each of the right and left moving rails 400 releases its locked state at the same time, thereby enabling the forward-and-backward movement of the seat.

The operation of the locking-release will be explained below, in conjunction with FIGS. 7a and 7b. When the operating lever 419 is pressed, the pushing plate 418 is moved towards the central lever 415, and consequently the leading portion of the pushing plate 418 pushes the operating pin 415a of the central lever 415. Therefore, the central lever 415 overcomes the spring force of the return spring 417 and rotates clockwise in the figure. As the central lever 415 rotates, at the underside of the base bracket 411 a linkage member 414 rotates clockwise about the rotating axle 416 of the central lever 415. Thus, the lock plate 413 is drawn inwards of the moving rail 400 such that the tooth 413a of the lock plate 413 is pulled out of the locking hole 304 of the fixed rail 300, thereby releasing the locked state between the two rails 300 and 400.

In this way, the user can adjust the position of the seat at the state that the locking between two rails is released. Then, when the user releases the handle 511a, the operating lever 511 is resiliently rotated in the opposite direction by the restoring force of the return spring 512 to thereby push the first linkage rod 513. As the first linkage rod 513 is pushed, the second linkage rod 514 is rotated in the opposite direction to release the pressed state of the operating lever 419. When the pressed state of the operating lever 419 is released, as shown in FIG. 7b, the central lever 415 is resiliently rotated counterclockwise by means of the restoring force of the return spring 417, which is mounted on the rotating axle 416 of the central lever 415. Then, the central lever 415 pushes the operating lever 419 back to its original position through the operating pin 415 and the pushing plate 418.

In addition, as the central lever 415 is resiliently rotated, the linkage member 414 under the base bracket 411 is rotated counterclockwise about the rotating axle 416 of the central lever. At this time, the linkage member 414 pushes the lock plate in the lateral direction, and thus the tooth 413a of the lock plate is inserted into the locking hole 304 of the fixed rail 300, thereby achieving a locked state between the two rails 300 and 400 and fixing the longitudinal position of the seat.

As shown in FIG. 1, the front locking mechanism 100 of the locking device 1 in the detachable seat is locked with two strikers 401 placed at the front side of the inside of the moving rail 400, and the rear locking mechanism 200 is locked with two strikers 402 placed at the rear side of the moving rail. Two pairs of strikers 401 or 402 are installed respectively at the front and rear sides of the locking assembly 410 in a symmetrical fashion. Inside the locking assembly 410, the operating lever 419 and the pushing plate 418 for rotationally operating the central lever 415 are installed in both the front and rear sides of the central lever. Therefore, the seat can be mounted in a reverse orientation, and the same operation for releasing the locked state of the locking assembly 410 can be carried out by using the handle 511a placed at the front side of the seat in the same manner as in the forward orientation thereof. That is, at the state where the seat is mounted in a reverse direction, when the handle 511 at the front side of the seat is pulled upwards, the locking-release means 500 is operated in the same way to push forwardly the operating lever 419 placed rearwards of the locking assembly 410 inside the moving rail 400. At this time, as the rearward operating lever 419 is pressed, the central lever 415 is rotated in the same direction and in consequence the lock plate 413 is drawn by the linkage member 414 at the lower side of the base bracket 411, thereby releasing the locked state.

Although not illustrated in the figures, in case of a reverse-oriented mounting, the front locking mechanism 100 of the locking device 1 is locked with two strikers 402 placed rearwards of the inside of the moving rail 400, and the rear locking mechanism 200 thereof is locked with two strikers 401 placed forwards of the inside of the moving rail.

Figure 8A:
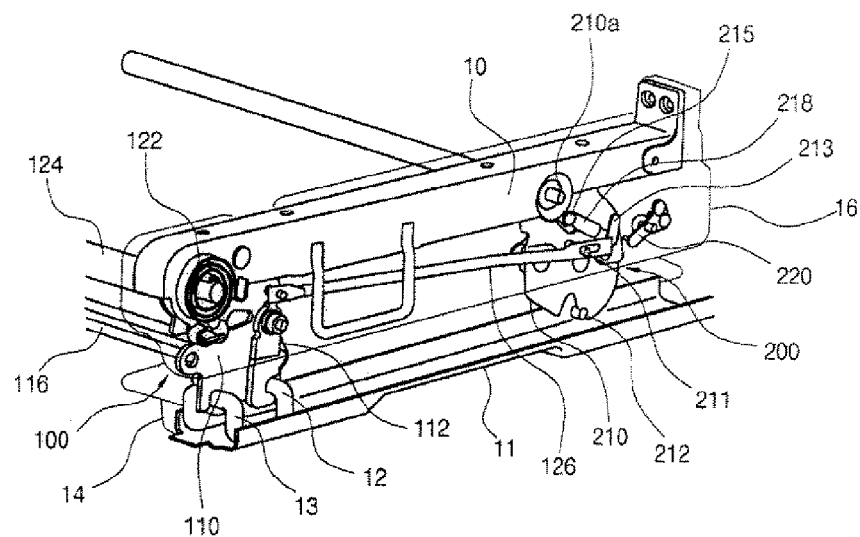
FIGS. 8a and 8b are perspective views of a conventional locking device where a seat can be double-folded.
Figure 8B:
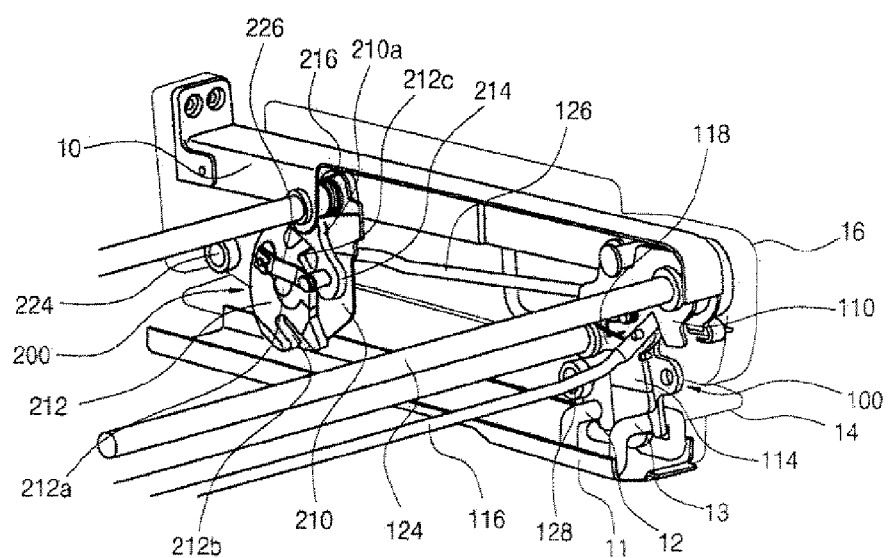
Figure 8C:
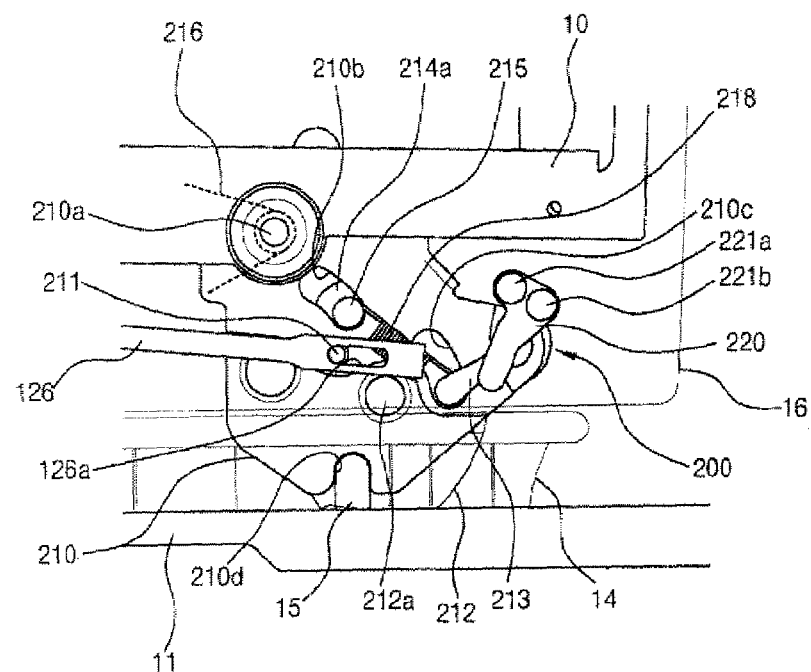

The present invention includes a locking device for a detachable vehicle seat, in which a user can confirm visually the locking state of the detachable seat, along with a double-folding function of the detachable seat (Korean Patent Application No. 2003-78837, filed on Nov. 8, 2003). As shown in FIGS. 8a to 8c, the locking device includes front and rear locking mechanisms 100 and 200 installed in the front and rear end portions of the leg frame below the seat. The locking mechanism has a main bracket 110, 210 supporting the leg frame 10 at the connected state with each striker 12, 13, 15. The locking mechanism is locked to or released from the striker by means of a lock plate 112, 114, and 212. The locking device includes a spring member 122 for providing a resilient restoring force so that the leg frame 10 can be rotated at the double-folded state about the front locking mechanism 100 when the rear locking mechanism 200 releases its locking state with the front locking mechanism 100 locked to the striker 12, 13.

In this locking device, the locking process of the front locking mechanism 100 includes two steps consisting of locking of a first lock plate 112 and locking of a second lock plate 114. When a user rotates downwardly the rear side of the seat and then pushes instantly so that the striker 15 is inserted into an inserting hole 212d of the main bracket of the rear locking mechanism 200, a locking of the rear locking mechanism 200 is accomplished. In this way, the locking device provides a locking of the rear side of the seat, and also at the front side of the seat two lock plates 112 and 114 completely catches the strikers 12, 13 fixed to the vehicle body, thereby achieving and maintaining a firm locking.

Additionally, at the state of the rear side of the seat raised after the locking process of the front locking mechanism 100, or at the state of the rear side of the seat automatically lifted by the resilient restoring force of the spring member 122 after the locking-release of the rear locking mechanism 200, the double-folding state of the seat is retained. The rear locking mechanism 200, in which the final locking is performed when mounting a seat, is provided with a state indicator for indicating a locked or released state through a indicating hole of the leg cover 16 installed outwards of the leg frame 100, in synchronized operation with the lock plate 212. Therefore, the locking state of the locking device can be visually confirmed through an indicating bracket 220.

Figure 9:
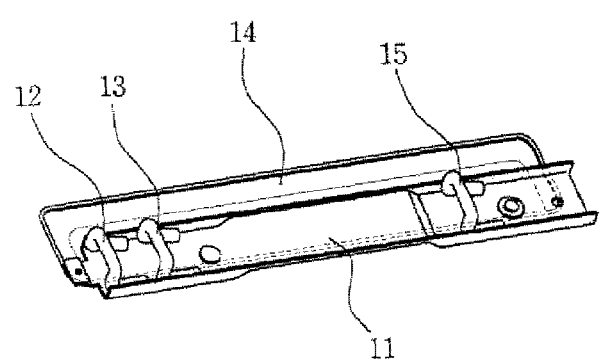
FIG. 9 is a perspective view of a conventional striker structure.
Figure 9:
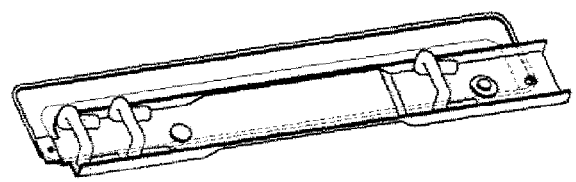

The locking device is structured such that it fixes its position by the locking with the striker fastened to the vehicle body. FIG. 9 is a perspective view of a striker applicable to the above-described locking device, which will be hereafter explained. As shown in the figure, a plurality of strikers 12, 13, and 15 are welded on the top surface of a bracket 11 bolt-jointed to the vehicle body floor panel. A striker cover 14 is fixedly installed above the bracket 11. Each striker 12, 13, 15 passes through the striker cover 14, and a transversal portion of the striker, which is caught by the lock plate, is placed inside the striker cover 14. Two strikers 12, 13, to which the front locking mechanism (reference numeral 100 in FIG. 8a) of the locking device is locked, are placed forwards of the inside of the striker cover 14. One striker 15, to which the rear locking mechanism (reference numeral 200 in FIG. 8a) is locked, is placed rearwards thereof.

Figure 10:
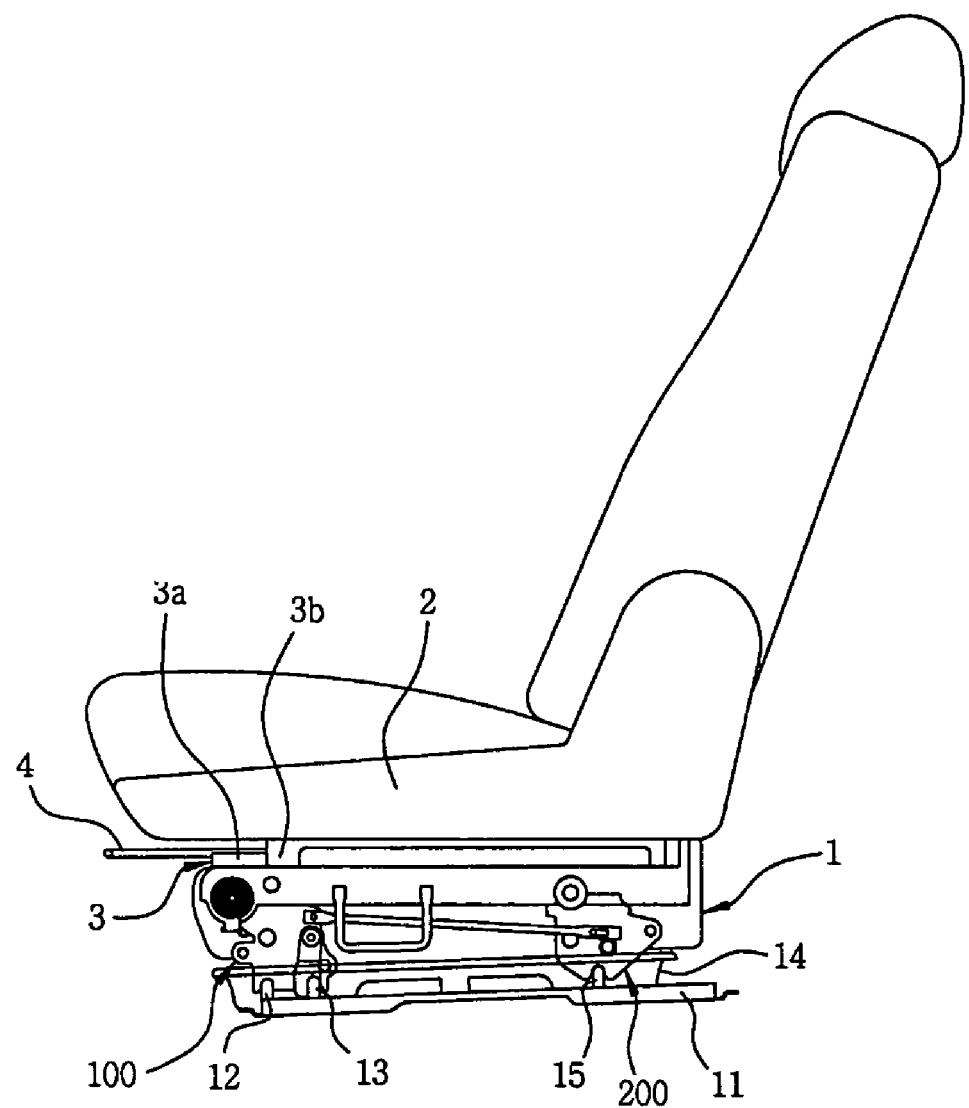
FIG. 10 is a side view showing an installation position of the slider rail in a detachable seat.

FIG. 10 is a side view of the seat schematically showing an installation position of the slider rail in a detachable seat. The slider rail 3 includes a fixed rail 3a to be fixed to the locking device 1 below the seat and a moving rail 3b to be fixed to a cushion frame 2. The moving rail 3b slides and moves on the fixed rail 3b forwards and backwards.

As described above, the slider rail according to the present invention has the following advantageous effects.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A slider rail for adjusting a longitudinal position of a detachable vehicle seat, the slider rail comprising:

right and left fixed rails capable of being mounted on a vehicle body floor and in a longitudinal direction, substantially parallel to each other;

a moving rail installed between the fixed rails and having an adjustable position along the fixed rails, the moving rail including a plurality of strikers to which a locking device at the lower side of the seat is to be locked, and a moving means for moving the moving rail back and forth between the fixed rails;

a locking assembly for selectively carrying out a locking or a locking-release between the fixed rails and the moving rail; and a locking-release operating means for operating the locking assembly so as to release a locking between the rails;

wherein the locking assembly comprises:

a cover fixedly installed inside the moving rail;

a base bracket mounted on the bottom surface of the moving rail and inwards of the cover, the base bracket having a '⌐▬⌐'-shaped structure;

a lock plate mounted under the base bracket, the lock plate including a plurality of teeth at one lateral side at substantially regular intervals, the lock plate being capable of moving laterally such that each tooth is locked into or released from a corresponding locking hole, the locking hole being formed at substantially regular intervals along the sidewall of the fixed rail;

an operating lever comprising a part that is exposed through an opening in the cover so that the operating lever can be pressed from outside by the locking-release operating means; and an operating means for laterally moving the lock plate such that a locking or a locking-release between the tooth and the locking hole can be performed, in synchronization with a pressing/releasing operation of the operating lever.

2. The slider rail in claim 1, further comprising a guide member having through-holes for the tooth of the lock plate to be passed through, wherein, when the lock plate moves laterally, each tooth of the lock plate is guided through the through-holes.

3. The slider rail in claim 1, wherein the operating means comprises:

a central lever mounted on an upper end portion of a rotating axle vertically passing through the base bracket, the central lever having an operating pin protruding at an end portion thereof;

a linkage means installed below the base bracket and connected between a lower end of the rotating axle and the lock plate, the linkage means laterally moving the lock plate by a rotating operation of the central lever:

a pushing plate coupled with the operating lever inside the cover, wherein, when the operating lever is pressed, a leading end portion of the pushing plate pushes the operating pin such that it moves along a guide slot to rotate the central lever; and a return spring installed in the rotating axle of the central lever, for providing a restoring force for the central lever to rotate in the base bracket along with the rotating axle.

4. The slider rail in claim 3, wherein the locking assembly is installed at the center of the length of the moving rail, the striker is installed in pairs at the front and rear sides of the locking assembly in a symmetrical fashion, the operating pin is installed respectively at both end portion of the central lever formed symmetrically about the rotating axle, and the operating lever and the pushing plate are installed each at the front and rear side of the rotating axle of the central lever.

5. The slider rail in claim 1, wherein the locking-release operating means comprises:

an operating lever having an elongated handle formed forwards of the seat and rotatably installed in the front portion of each of right and left leg frames where a front locking mechanism of the scat locking device is placed, wherein the operating lever is resiliently rotated by the restoring force of the return spring when the drawn handle is released;

a first linkage rod that is capable of being moved forwards and backwards by the rotating operation of the operating lever to which one end of the first linkage is connected; and a second linkage rod rotatably installed in the other side of the leg frame, one end of the second linkage rod being connected to the other end of the first linkage rod and the other end thereof constituting a pressing end for pressing the operating lever such that, when the handle is drawn, the second linkage rod is rotated while being drawn by the first linkage rod to thereby press the operating lever of the locking assembly.

6. The slider rail in claim 1, wherein the moving means comprises main rollers installed at both sides of the front and rear portions of the moving rail and moving along the bottom surface of the fixed rail, and auxiliary rollers installed at the front end and rear end portions of the moving rail and moving along the inner surface of both sidewalls of the fixed rail.

* * * * *